US009087448B2

(12) United States Patent
De Buysscher et al.

(10) Patent No.: US 9,087,448 B2
(45) Date of Patent: Jul. 21, 2015

(54) PROGRAMMING A UNIVERSAL REMOTE CONTROL

(75) Inventors: Yve De Buysscher, Mere (BE); Rogier Louis Jacques Willem Thissen, Heist-op-den-Berg (BE)

(73) Assignee: Home Control Singapore Pte. Ltd., Toa Payoh (SG)

( * ) Notice: Subject to any disclaimer, the term of this patent is extended or adjusted under 35 U.S.C. 154(b) by 233 days.

(21) Appl. No.: 13/700,829

(22) PCT Filed: May 30, 2011

(86) PCT No.: PCT/IB2011/052373
§ 371 (c)(1),
(2), (4) Date: Feb. 15, 2013

(87) PCT Pub. No.: WO2011/151780
PCT Pub. Date: Dec. 8, 2011

(65) Prior Publication Data

US 2013/0136455 A1 May 30, 2013

(30) Foreign Application Priority Data

Jun. 4, 2010 (EP) .................................... 10164965

(51) Int. Cl.
*G05B 11/01* (2006.01)
*G08C 23/04* (2006.01)
*G08C 19/28* (2006.01)

(52) U.S. Cl.
CPC ................ *G08C 23/04* (2013.01); *G08C 19/28* (2013.01); *G08C 2201/21* (2013.01); *G08C 2201/33* (2013.01); *G08C 2201/92* (2013.01)

(58) Field of Classification Search
CPC ........... G08C 2201/92; G08C 2201/33; H04N 5/4403; H04N 2005/4435; H04N 21/42225
USPC .................. 340/12.23, 4.3, 4.11, 12.5, 13.24; 341/176
See application file for complete search history.

(56) References Cited

U.S. PATENT DOCUMENTS 5,483,440 A 1/1996 Aono et al.
5,819,294 A * 10/1998 Chambers .................. 340/12.24
6,597,374 B1 7/2003 Baker et al.
RE39,059 E 4/2006 Foster
7,548,246 B2 6/2009 Huang et al.
2002/0032904 A1* 3/2002 Lerner ............................ 725/14
2004/0207535 A1* 10/2004 Stevenson et al. ........ 340/825.22
2007/0271267 A1* 11/2007 Lim et al. .......................... 707/6
2007/0296552 A1* 12/2007 Huang et al. ................. 340/10.5
2008/0174467 A1 7/2008 Drimusz et al.
2010/0207778 A1* 8/2010 Haughawout et al. ......... 340/825
2011/0018693 A1* 1/2011 Lim et al. ..................... 340/12.5
2012/0146918 A1* 6/2012 Kreiner et al. ................ 345/173

FOREIGN PATENT DOCUMENTS

EP 1578016 A1 9/2005
WO 2009107029 A1 9/2009

* cited by examiner

*Primary Examiner* — Phung Nguyen
(74) *Attorney, Agent, or Firm* — Hamilton, Brook, Smith & Reynolds, P.C.

(57) ABSTRACT

A method of programming a Universal Remote Control is described. A user is requested to execute a command sequence comprising more than one command from an original Remote Control for controlling a device (306). The commands from said sequence are captured and analyzed (308). The analyzed commands are matched with a code-set or branches of a code-tree data base (310). The command sequence is used for generating a macro for executing an activity including the device (316).

11 Claims, 3 Drawing Sheets

PROGRAMMING A UNIVERSAL REMOTE CONTROL

FIELD OF THE INVENTION

The invention relates to a method and a system of learning Remote Control commands for programming a Universal Remote Control (URC).

BACKGROUND OF THE INVENTION

URCs are typically programmed by accessing a database of infra-red code-sets. These code-sets are usually grouped per brand and device type (TV, DVD, etc.). However, because of the huge variety of devices in the market, which are controlled with remote controls, the information in these databases is often incomplete. In this case, it may be a problem to set up a universal remote control and program all the buttons needed for working. Even in case that the right code set is available in the database, finding it can be a real challenge.

U.S. Pat. No. 5,819,294 discloses a method dealing with this issue. According to this method, a programmable URC is programmed by a PC. There is a database for sets of codes used by a variety of commercially available remote controllers, which may either reside on the PC or in the remote control. The database contains sets of compressed codes. In order to program the URC for controlling an apparatus, the user lets the PC find a match between a single pulse-code (command) transmitted by a specific known remote control for controlling the apparatus on the one hand and an item in the database on the other hand. Upon finding the match, the set containing the matching item is stored in the programmable remote control controller as corresponding to the particular apparatus that is controllable via the specific remote control.

SUMMARY OF INVENTION

It is an object of the invention to provide an improved method and a system of learning Remote Control commands for programming a Universal Remote Control (URC). The invention is defined by the independent claims. The dependent claims define advantageous embodiments.

Advantageously, the invention goes a step further in the capturing of information from an original remote control and does not only match on codes, but also gets information on how a remote control is used by the user to carry out some actions, for example turn on and turn off a device, switch inputs of a device, etc.

According to a first aspect of the invention, a method is provided of programming a Universal Remote Control, the method comprising:

- requesting in a Remote Control learning program a user to execute a command sequence comprising more than one command from an original Remote Control for controlling a device or from another Universal Remote Control programmed for controlling the device;
- analyzing captured commands from said sequence;
- matching said analyzed commands with a code-set or branches of a code-tree data base; and
- using the command sequence for generating a macro for executing an activity including the device.

By requesting the user to execute a command sequence, behavioral data may be collected on how the user controls the devices. For example, information may be retrieved on which code (command) is used to switch the device off, which code is used to switch on the device on, how does the user switch to a multi-digit channel (e.g. channel 25), how does he switch to a certain input on a device (e.g. HDMI-2), etc. This behavioral data is used to automatically generate activity related macros. As an example, a user generally speaking may switch on a TV, which is in standby-mode, by pressing the power toggle button, by pressing a channel button (e.g. the "1") or by pressing a channel up button. However, in some older types of TV-sets the power toggle button can only be used to switch the TV off and not for switching it on. So, in case of preparing a macro involving the step of switching on such a TV-set the use of the code corresponding to the power toggle button for this purpose should be avoided. By collecting behavioral data, it may be noticed that the user does not use the power toggle button to switch the TV-set on and the use of the corresponding code in a macro may be avoided.

Another example where the generation of a macro is not obvious is the Apple remote control, which is used for controlling Apple® TV, iPod®, or Mac®. The code-set of this remote control does not have a power code. Hence, by looking at the code-set, it is not possible to know how the controlled device is switched on. By asking the user to press the button to switch on the Apple® TV, the code used for this purpose (in this case the menu button) can be retrieved and that information can be used for the generation of macros later on.

A still further example is the case of a home theater system having an amplifier/tuner and DVD-player, wherein the tuner is connected to input-1 and the DVD-player to input-2 of a TV-set, for example. Often, code-sets do not comprise a specific code ("tuner") for switching to the tuner. By requesting the user to switch to the tuner and retrieving the information that he uses the Input-1 code for this purpose, a macro can be generated for the activity switch on tuner, wherein the TV and the tuner are both switched on and the TV is switched to input-1.

A further advantage is that by capturing the commands from the original remote control, the URC can adjust its timings to better match the timings of the original remote control. For example, remote controls of some brands transmit some commands, such as power on/off for a longer time (e.g. 2 seconds) than others (0.5 seconds) for reliability reasons. By copying such behavior to the URC, it can also control the device corresponding to the original remote control in a more reliable way. Furthermore, the universal remote control can use the captured commands instead of the database commands for guaranteed success.

According to an embodiment, in the Remote Control learning program a virtual device is started corresponding to the device controlled by the original Remote Control and a status of the virtual device is varied according to the captured and analyzed commands. In this way, the user is provided with an intuitive feedback, wherein the virtual device reacts to the commands in the same way as the real device.

According to a further embodiment, the Remote Control learning program is an application on a Personal Computer, which captures the commands directly or via the Universal Remote Control. As a result, the Universal Remote Control programming may be performed by means of an apparatus (the PC) available in most households nowadays.

According to a still further embodiment, the method comprises the further step of requesting a user to enter a device type and brand name of the device controlled by the original remote control. This information may be used to display the correct virtual device.

According to a still further embodiment the method comprises the further step of improving said matched code-set or code-tree using the analyzed commands. Sometimes, the existing code-sets or code-trees are incomplete or do not match, entirely with the code set/code-tree used to control the device (some commands match and some others do not). In this case, it is useful to replace erroneous commands and/or add missing commands with the commands received from the original remote control.

According to a yet further embodiment the method comprises the further step of, in case that there is no code-set or there are no branches of a code-tree data base available to which the analyzed commands can be matched, learning the codes of the original remote control. As a result, also new (i.e. previously unavailable code-sets in the data base) can be learned and used for activity macro generation.

According to a still further embodiment the method comprises the step of collecting statistical data about devices and their corresponding code-sets for which the method is used. In this way, the codesets can be prioritized and it can be determined which ones are more popular than others. Furthermore, obsolete (hardly used) code-sets can be determined and deleted from servers or databases to save memory space.

According to a yet further embodiment, the user is requested to select the devices taking part in the activity and a macro is recorded by executing a command sequence including commands for all selected devices. Consequently, a macro for a plurality of devices may be conveniently obtained.

Preferably, the method according to the invention is implemented by means of a computer program that may run on any programmable hardware, e.g. a computer, a digital signal processor, a field-programmable gate array, an application-specific integrated circuit, a micro-processor, or a micro-controller.

The computer program may be embodied on a computer readable medium or a carrier medium may carry the computer program.

According to a second aspect of the invention a system is provided comprising a controller configured for:

- requesting in an Remote Control learning program a user to execute a command sequence comprising more than one command from an original Remote Control for controlling a device or from another Universal Remote Control programmed for controlling the device;
- analyzing captured commands from said sequence;
- matching said analyzed commands with a code-set or branches of a code-tree data base; and
- using the command sequence for generating a macro for executing an activity including the device.

In an embodiment, the system may be a URC.

These and other aspects of the invention will be apparent from and elucidated with reference to the embodiments described hereinafter.

BRIEF DESCRIPTION OF THE DRAWINGS

These and other aspects of the invention will be apparent from and elucidated further with reference to the embodiments described by way of example in the following description and with reference to the accompanying drawings, in which.

Throughout the figures like reference numerals refer to like elements.

DETAILED DESCRIPTION OF EMBODIMENTS

Figure 1:
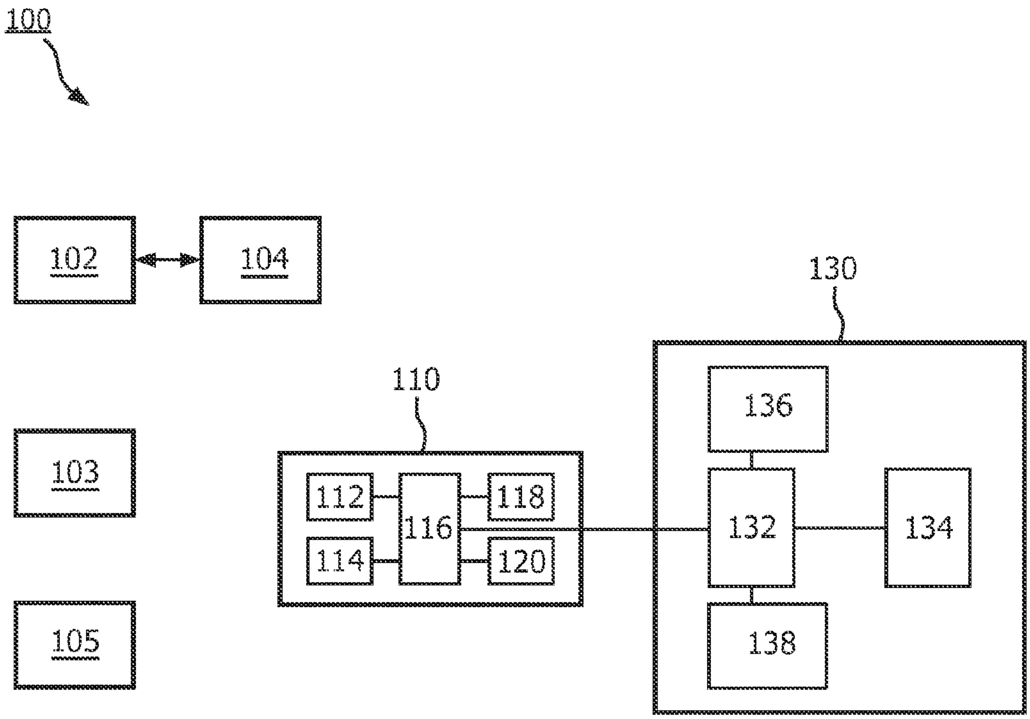
FIG. 1 is a block diagram of a system according to an embodiment of the invention.

FIG. 1 is a block diagram of a system 100 according to a first example. The system 100 is a home entertainment system. System 100 comprises a first apparatus 102, here a TV set. Apparatus 102 has multiple functionalities that are user-controllable, e.g., "TV-on/off", "channel up/down", "mute", "brightness up", etc. The TV set 102 has a corresponding remote control 103. System 100 has also a second apparatus 104, here a DVD player, also with multiple user-controllable functionalities: "on", "play", "forward", "eject disc", etc. The DVD player 104 also has a corresponding remote control 105. System 100 further comprises a programmable Universal Remote Control (URC) 110. The URC comprises an IR receiver 112, an IR transmitter 114, a controller 116 (implemented as a processor with associated memory), a memory 118 and a user-interface (UI) 120 with multiple user-inputs (e.g., buttons, or soft keys on a GUI, not shown). The multiple user-inputs provide selective control of a particular one of the functionalities of apparatus 102 and 104 by sending a particular one of multiple control signals (commands) once URC 110 is programmed. System 100 further comprises a Personal Computer (PC) 130 for programming of URC 110. The PC comprises a controller 132, (implemented as a processor with associated memory) and a memory 134 storing a database with a plurality of data. Each respective data is representative of a respective set of control commands (signals) in compressed digital format. Each respective set comprises control commands for control of a respective one of a plurality of apparatus. The apparatus may differ in type, e.g., a TV receiver versus a DVD-player; and/or the apparatus may differ in brand, e.g., Philips®, Marantz®, etc. The PC furthermore comprises, as is usual, a display 136 and a user interface 138, e.g. a keyboard and a mouse. URC 110 is connected to the PC 130 via a communication port, as is well known, and works as the IR receiver of the PC. Alternatively, the PC may comprise a separate IR receiver for receiving the IR commands and the URC may be connected to another port of the PC 130.

The IR receiver 112 of the URC 110 receives control commands provided by one of the original remote controls 103, 105 that come with TV set 102 and DVD player 104, respectively. The control commands (or codes, the terms codes and commands are used as synonyms in this description) are, for example, the IR control signal that controls a functionality X (power on) of an apparatus of type Y (TV set 102) manufactured by a company Z (Philips). IR receiver 112 samples the specific signal captured and converts the sampled signal into a digital word of a compressed data format, which is forwarded to the PC in a way, known as such. The controller 132 of the PC analyzes the digital word and queries memory 134 in order to verify if memory 134 stores a data item that is representative of this digital word. If controller 132 retrieves a matching data item, according to a first possibility the data corresponding with the complete set of control signals that contains this specific control signal is identified as matching. That is, identification is accomplished on the basis of the specific control signal received by receiver 112. Once a set has been identified, PC 130 configures programmable controller 116 to associate the control commands of the identified set with the multiple user-inputs. Configuration of URC 110 for DVD player 104 is hereupon achieved in a similar manner, using the remote control 105 coming with the DVD player 104. The database with the code-sets may of course also be provided by means of an external server accessible by means of the Internet instead of the memory 134 of the PC.

According to a second possibility, Infrared (IR) trees instead of code-sets are used. This technique for matching code sets is discussed in more detail in WO 2009/107029 A1. In this approach code-sets that have the same power toggle code are grouped into one IR tree. The main difference with the first approach, discussed herein above, is that in an IR tree, each code can have several alternatives (occurrences). These occurrences are sorted in order of popularity. The most popular one is selected. At this point, there are still several possible IR codes in the tree for some functions. For example: after selecting the IR tree based on the received Powert Toggle code, there are still several possibilities for the volume keys. By asking the user to turn up the volume on the virtual TV, the information is obtained which set of volume functions should be used. The more information is collected from the remote control, the more accurate the set of IR codes will become.

Writing of the signals of the identified set to memory 118 of URC 110 so as to configure this device as a controller for, in this example, TV set 102, may be achieved in a variety of manners known as such and described in detail in U.S. Pat. No. 5,819,294.

Figure 2:
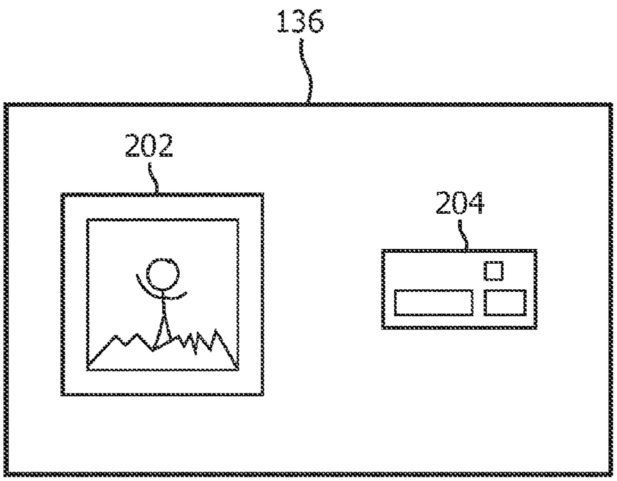
FIG. 2 shows the representation of virtual devices on a display according to an embodiment of the invention.
Figure 3:
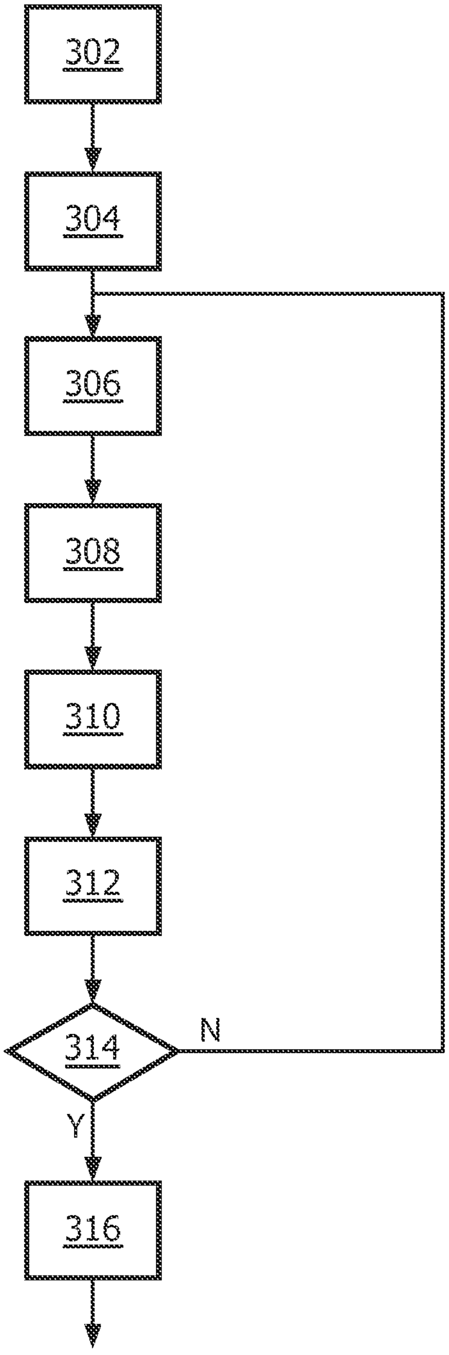
FIG. 3 is a flow diagram explaining the steps in the programming of the Universal Remote Control.

FIG. 3 is a flow diagram illustrating the remote control learning program carried out by the controller 132. Thereto, the (associated memory of the) processor thereof is loaded with a suitable software application. Assume that the user wants to control his TV set with his universal remote control. After selecting that he wants to add a TV set to the set of devices for which the URC is programmed and entering the brand of the TV set (step 302), a simulated "virtual" TV set 202 appears on the display 136 of the computer (step 304), as shown in FIG. 2. The TV set 202 is playing. The user is asked to use his original remote control 103 to perform a certain action (step 306), in this case switch off this virtual TV set 202. The infra-red code gets captured and analyzed (step 308). As the captured code is not accurate enough to simply compare it with information in the database, it has to be analyzed. There are tolerances in terms of timing of the IR signal, the user might have been waving the remote control, etc. The signal needs to be analyzed, i.e. processed, cleaned up and simplified in order to compare it with data in the database. Then, the code is matched to the most likely set of IR codes for that device and brand (step 310) and the virtual TV set 202 switches off (step 312). Steps 310 and 312 are not necessarily executed in this order. Alternatively, matching can happen in the background, thereby keeping the user interface responsive. After checking if all commands of the command sequence to be input by the user have been captured (step 314), the method loops back to step 306 wherein the user is asked to switch on the virtual TV set 202. The user presses the button he normally uses to switch on his TV set. The infra-red code gets captured (step 308), the matching step 310 is executed again, to see if any fine tuning of the code-set for the TV set is possible and the virtual TV set switches on (step 312).

Since the application now knows how to switch on and off this TV set, it can easily use this information to generate activity macros wherein multiple devices get switched on and off with a single button press.

Steps 306-312 may be repeated for further commands, for example the user is asked to turn up the volume, to switch to a channel, to use the cursor keys, etc. All these IR codes (commands) are captured and allow the application to further fine-tune the set of IR codes used for this TV and to better generate activity macros (step 316).

An extension of this example can be used to record activity macros by interacting with a set of virtual devices. For example, after adding the TV set and the DVD player with the abovementioned method described with reference to FIG. 3, the user wants to add an activity "Watch a DVD". He is asked to select the devices that will take part of this activity and selects these two devices. The two devices, i.e. the TV-set 202 and the DVD-player 204 show up on the display 136 of the computer and the user can record a macro by interacting with these devices. The user can interact with the devices by using his original remote controls 103, 105 or by using a universal remote control already programmed for interacting with these two devices. So, in this embodiment a single command sequence is used to control two devices.

Figure 4:
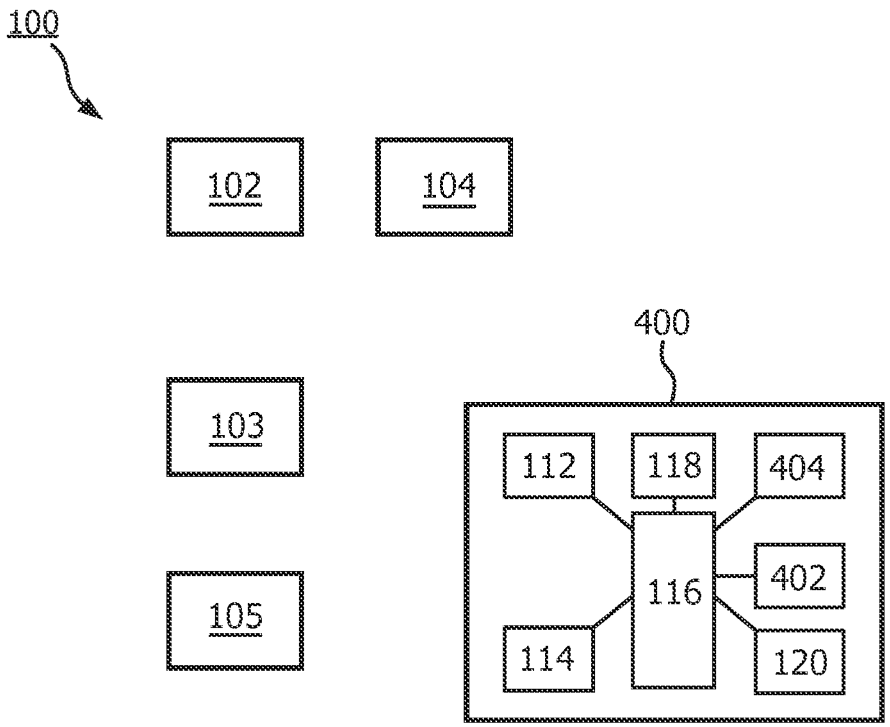
FIG. 4 is a block diagram of a system according to a further embodiment of the invention.

FIG. 4 shows an alternative example of the system 100. Here, the controller 116 of the URC 400 itself is loaded with the software application for programming the URC. Controller 116 is coupled to a memory circuit 402 comprising the database with the code-sets. The URC further comprises a display 404 for providing feedback and instructions to the user as well as displaying the virtual devices 202, 204.

In another example, the software application runs on a mobile computing device such as a smartphone connected to an IR receiver (wired or wireless).

Incomplete code-sets or code trees in the memory of the PC/URC, may be improved using captured and analyzed commands received from one of the original remote controls 103, 105.

Furthermore, in case that there is no code-set or there are no branches of a code-tree data base available to which the analyzed commands can be matched, the codes of the original remote control can be learned one-by-one.

Statistical data about devices for which the method is used may be collected. As the code-tree is a data structure that combines several code sets based on their popularity ranking, by collecting statistical data, it can be assured that the root of the tree is always the most popular code set, instead of just relying on information provided by the database supplier. Furthermore, in this way, it may be determined which of the code sets in a data base are used frequently and which ones are obsolete. The obsolete ones may be deleted from the data base to save memory space.

It should be noted that the above-mentioned embodiments illustrate rather than limit the invention, and that those skilled in the art will be able to design many alternative embodiments without departing from the scope of the appended claims. The mere fact that certain measures are recited in mutually different dependent claims does not indicate that a combination of these measures cannot be used to advantage. The word 'comprising' does not exclude the presence of other elements or steps than those listed, and the word 'a' or 'an' preceding an element does not exclude the presence of a plurality of such elements. Any reference signs do not limit the scope of the claims. The invention may be implemented by means of both hardware and software, and several elements may be represented by the same item of hardware or software, and a processor may fulfill the function of one or more elements, possibly in cooperation with hardware elements.

The invention claimed is:

1. A method of programming a Universal Remote Control, the method comprising:

requesting, in a Remote Control learning program, a user to execute a command sequence comprising more than one command from an original Remote Control for controlling a device or from another Universal Remote Control programmed for controlling the device;

analyzing captured commands from said sequence;

matching said analyzed commands with a code-set or branches of a code-tree data base; and using the command sequence for generating a macro for executing an activity including the device, wherein, in the Remote Control learning program, a virtual device is started corresponding to the device controlled by the original Remote Control, and wherein a status of the virtual device is varied according to the captured and analyzed commands.

2. The method as claimed in claim 1, wherein the Remote Control learning program is an application on a Personal Computer.

3. The method as claimed in claim 2, wherein the Personal Computer captures the commands directly or via the Universal Remote Control.

4. The method as claimed in claim 1, wherein the method comprises the further step of:

improving said matched code-set or code-tree using the analyzed commands.

5. The method as claimed in claim 1, wherein the method comprises the further step of:

in case that there is no code-set or there are no branches of a code-tree data base available to which the analyzed commands can be matched, learning the codes of the original remote control.

6. The method as claimed in claim 1, wherein the method comprises the further step of:

collecting statistical data about devices for which the method is used.

7. The method as claimed in claim 1, wherein the user is requested to select the devices taking part in the activity and records the macro by executing a command sequence including commands for all selected devices.

8. The method as claimed in claim 1, wherein said method further comprises the step of:

requesting the user to enter a device type and brand name of the device controlled by the original remote control.

9. A non-transitory computer-readable storage medium encoded with a computer program comprising computer program code for causing a computer to perform the steps of the method as claimed in claim 1 when said program is run on the computer.

10. A system comprising a controller configured for:

requesting in an Remote Control learning program a user to execute a command sequence comprising more than one command from an original Remote Control for controlling a device or from another Universal Remote Control programmed for controlling the device;

analyzing captured commands from said sequence;

matching said analyzed commands with a code-set or branches of a code-tree data base; and using the command sequence for generating a macro for executing an activity including the device, wherein, in the Remote Control learning program, a virtual device is started corresponding to the device controlled by the original Remote Control, and wherein a status of the virtual device is varied according to the captured and analyzed commands.

11. The system as claimed in claim 10, wherein the controller is further configured for:

requesting the user to enter a device type and brand name of the device controlled by the original remote control.

* * * * *